UNITED STATES PATENT OFFICE.

CHARLES F. LE FEVRE, OF HAGERSTOWN, MARYLAND.

CEMENT.

SPECIFICATION forming part of Letters Patent No. 504,477, dated September 5, 1893.

Application filed March 24, 1893. Serial No. 467,503. (No specimens.)

*To all whom it may concern:*

Be it known that I, CHARLES F. LE FEVRE, a citizen of the United States, residing at Hagerstown, in the county of Washington and State of Maryland, have invented a certain new and useful Cement, of which the following is a specification.

The object of my invention is to provide a cement specially adapted to secure a strong connection or permanent union between a metal surface and one composed of vulcanized rubber or analogous material. I have discovered that such connection can be made with a cement composed of the following ingredients combined in the following proportions: borax, twenty-five per cent., rosin, twenty-five per cent. and glue, fifty per cent. I take by measure twenty-five per cent. of borax, twenty-five per cent. of rosin and fifty per cent. of glue, preferably comminuted or pulverized and dissolve them in the requisite quantity of warm water to a liquid consistency, and then gradually inspissate or thicken the composition until it is in a viscid condition.

I have in practice found this cement particularly advantageous in uniting the metal and rubber tires of velocipedes, as it does so firmly that the rubber will give way before the cement, which resists both heat and moisture.

I have above given the proportions with which I have obtained the best results in practice, but they may be varied within certain limits without departing from my invention. Good results may be obtained without the use of borax, but the borax employed in the cement, has the effect of roughening the surface of the metal, and enables the glue and rosin to take a firmer hold than they otherwise would.

I claim as my invention—

1. The cement hereinbefore described consisting of borax twenty-five per cent., rosin twenty-five per cent., glue fifty per cent., comminuted or pulverized, dissolved in water and thickened, substantially as set forth.

2. The cement herein described, consisting of borax, rosin and glue in about the proportions and treated substantially as set forth.

In testimony whereof I have hereunto subscribed my name.

CHAS. F. LE FEVRE.

Witnesses:
   H. A. YINGLING,
   A. YINGLING.